US012085974B1

(12) United States Patent
Glazer

(10) Patent No.: US 12,085,974 B1
(45) Date of Patent: Sep. 10, 2024

(54) SYSTEM AND METHOD FOR LEVER WITH THREE DIMENSIONAL LOG SPIRAL MECHANISM FOR REPEATING LEVERAGE

(71) Applicant: Yaron Y. Glazer, San Francisco, CA (US)

(72) Inventor: Yaron Y. Glazer, San Francisco, CA (US)

( * ) Notice: Subject to any disclaimer, the term of this patent is extended or adjusted under 35 U.S.C. 154(b) by 0 days.

(21) Appl. No.: 18/642,698

(22) Filed: Apr. 22, 2024

Related U.S. Application Data

(60) Provisional application No. 63/460,959, filed on Apr. 21, 2023.

(51) Int. Cl.
*G05G 1/04* (2006.01)

(52) U.S. Cl.
CPC .................................... *G05G 1/04* (2013.01)

(58) Field of Classification Search
CPC .. G05G 1/04; G05G 1/06; F16H 21/10; F16H 21/16; F16H 21/44; F16H 21/52; F16H 21/54; F16H 51/00
See application file for complete search history.

(56) References Cited

U.S. PATENT DOCUMENTS

| | | | | |
|---|---|---|---|---|
| 966,412 | A | 8/1910 | Alinder | |
| 1,083,084 | A | 12/1913 | Gilbert | |
| 5,182,967 | A | 2/1993 | Yoshizawa et al. | |
| 5,570,607 | A | 11/1996 | Yoshizawa | |
| 7,765,916 | B2 | 8/2010 | Ophardt et al. | |
| 2007/0138886 | A1 * | 6/2007 | Krebs | F16H 37/14 310/112 |
| 2016/0137314 | A1 | 5/2016 | Storm | |

FOREIGN PATENT DOCUMENTS

| | | | | |
|---|---|---|---|---|
| CN | 106346386 | A | * | 1/2017 |
| CN | 106826854 | A | * | 6/2017 |
| CN | 214520217 | U | * | 10/2021 |
| CN | 215240898 | U | * | 12/2021 |
| EP | 0005453 | B1 | | 11/1979 |

OTHER PUBLICATIONS

I Made a Drum Robot and Wrote a Song With It; https://tristancalderbank.com/2019/10/05/drum-robot/; Published Oct. 5, 2019 (Year: 2019).*
DrumCube, an Arduino Robot Drummer; https://www.instructables.com/DrumCube-an-Arduino-Robot-Drummer/.*
LogosFoundation; https://logosfoundation.org/instrum_gwr/snar2.html; Published in 2014 (Year: 2014).*
Robotic Arms Transform Drummers into Cyborgs; https://www.mddionline.com/robotics/robotic-arms-transform-drummers-into-cyborgs; Published on Feb. 19, 2016 (Year: 2016).*
Dynamic Fulcrums: How Fulcrums Shift Around in Drumming, johnlambdrums.com. https://johnlambdrums.com/shifting-fulcrums/ [Date accessed: Feb. 7, 2023].

* cited by examiner

*Primary Examiner* — Adam D Rogers
(74) *Attorney, Agent, or Firm* — Bold IP PLLC; Christopher Mayle

(57) ABSTRACT

A system and method for a lever that is formed by a rod gripped with a three dimensional log spiral structure that applies alternating downward rotational force at two points along the rod, producing rhythmic applications of leverage around its fulcrum. As one end of the spiral rotates down with application of force, the other is rotated up via segmental action of the components of the log spiral component and positioned for a subsequent downstroke.

14 Claims, 8 Drawing Sheets

SYSTEM AND METHOD FOR LEVER WITH THREE DIMENSIONAL LOG SPIRAL MECHANISM FOR REPEATING LEVERAGE

CROSS REFERENCE TO RELATED APPLICATIONS

This application claims priority to U.S. Patent Application No. 63/460,959 filed on Apr. 21, 2023 which is incorporated in its entirety

FIELD OF DISCLOSURE

The overall invention relates generally to levers and handles and, more particularly, to an articulated structure to replace or enhance levers utilizing mechanics that mimic the human anatomy.

BACKGROUND

The lever is a simple machine that has been used in connection with any number of machinery for several millennia. Conventional levers for various devices are generally fixed in position and require the user to apply force in a particular direction on a two dimensional plane. This can result in discomfort, injury, and fatigue to the user, especially during extended periods of use. There are many versions of the lever, but all rely on resetting the lever device after use, often counter to gravity at significant energetic cost. Furthermore, conventional levers may not provide the necessary torque for certain tasks without considerable force, resulting in inefficient or ineffective performance. Thus, there is a need for a handle that provides improved ergonomics and increased torque for the user whilst utilizing a three dimensional space.

SUMMARY

It is an object of the present description to provide a system and method for a lever that provides general improvements in efficiency for devices that produce repeating patterns of two dimensional rotation (e.g., hammers, hinges) by optimizing movement across three dimensions, rather than simplifying the problem to two dimensions as the standard lever does. Many different applications are possible, particularly where repeated striking (e.g., hammer) or opening and closing (e.g., hinge) are called for.

The lever is a general solution for applying rotational force in two dimensions. The invention improves on the concept, optimizing across three dimensions to increase efficiency and control. The lever is formed by a rod gripped with a three dimensional log spiral structure that applies alternating downward rotational force at two points along the rod, producing rhythmic applications of leverage around its fulcrum. As one end of the spiral rotates down with application of force, the other is rotated up via segmental interaction of the constituent parts of the log spiral component and positioned for a subsequent downstroke.

The invention is biomimetic, based on a novel theory that proposes an alternative biomechanics framework for the human hand. Generally, the invention proposes to improve the efficiency of some levers by complicating the effort force with a third dimension consisting of rotational motion, which may have the effect of moving the position of the effort with respect to the load and fulcrum. One specific application is a cyclic stroke 3rd class lever, such as a repeating hammer. A standard 3rd class lever such as a simple hammer has a two-stroke cycle, with the head rising and falling with application of effort at a static point between the fulcrum and the load.

The invention introduces a three-dimensional log spiral mechanism to apply effort, positioning it over the fulcrum with two effort arms at either end of the spiral mechanism in three-dimensional symmetry around the fulcrum. The spiral mechanism is a single segment of a three dimensional log spiral, with components biomimetic of the bones, muscles, and connective tissue of the hand. To engage the lever, downward rotational force is applied to the surface of the rod via one effort arm. The three dimensional spiral shape of the spiral mechanism translates this effort to a hammer stroke at the "head" end of the rod. At the same time, as the active effort arm rotates below the horizontal plane of the lever (i.e., parallel to the striking surface of the lever), the three-dimensional spiral shape rotates the inactive effort arm up over the horizontal plane.

Downward rotational force can then be applied to the rod via the second effort arm, initially raising the "head" of the lever and then producing another hammer stroke at the "head" while rotating the first effort arm back above the horizontal plane. The invention improves the efficiency of a standard stroke repeating hammer by eliminating the impact of gravity on the upstroke. The alternating application of downward rotational force at two effort arms on either side of the fulcrum also appears to toggle the lever class between 1st and 3rd, potentially introducing additional efficiency during the 1st class lever stroke. The "head" end of the rod can be equipped with various shapes/devices, like a ball or wedge. As such, the parts of the invention will be familiar, but the mechanics of their use (the controls or algorithm) will be novel.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION

Figure 1:
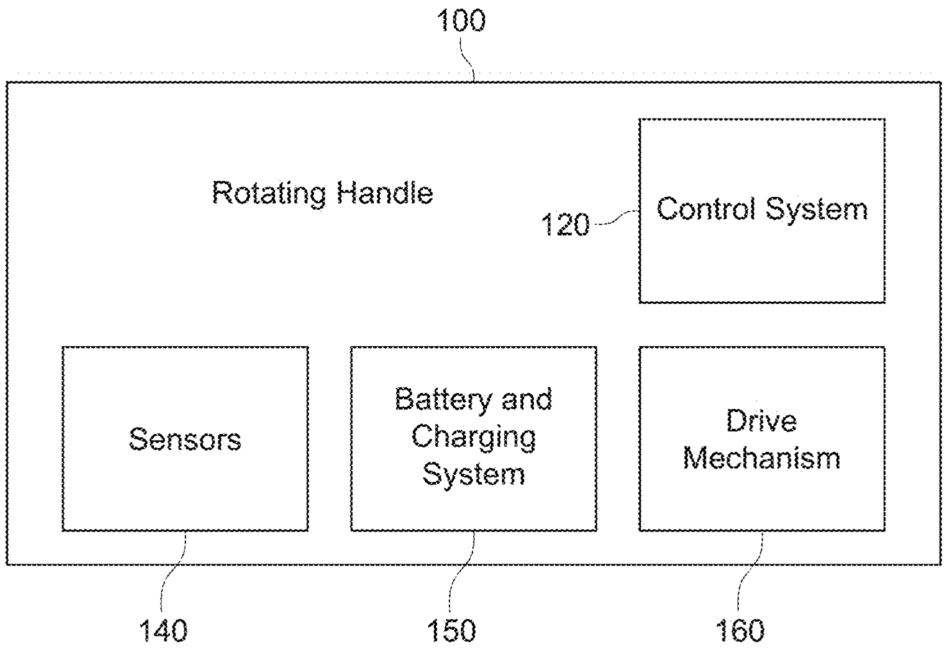
FIG. 1 illustrates the components of the rotating handle.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items" may indicate the presence of only one item or may indicate more items. Thus, the term "set" may be equivalent to "one or more" as used herein.

In the following detailed description, numerous specific details are set forth in order to provide a more thorough understanding of the one or more embodiments described herein. However, it will be apparent to one of ordinary skills in the art that the invention may be practiced without these specific details. In other instances, well-known features have not been described in detail to avoid unnecessarily complicating the description.

Figure 3A:
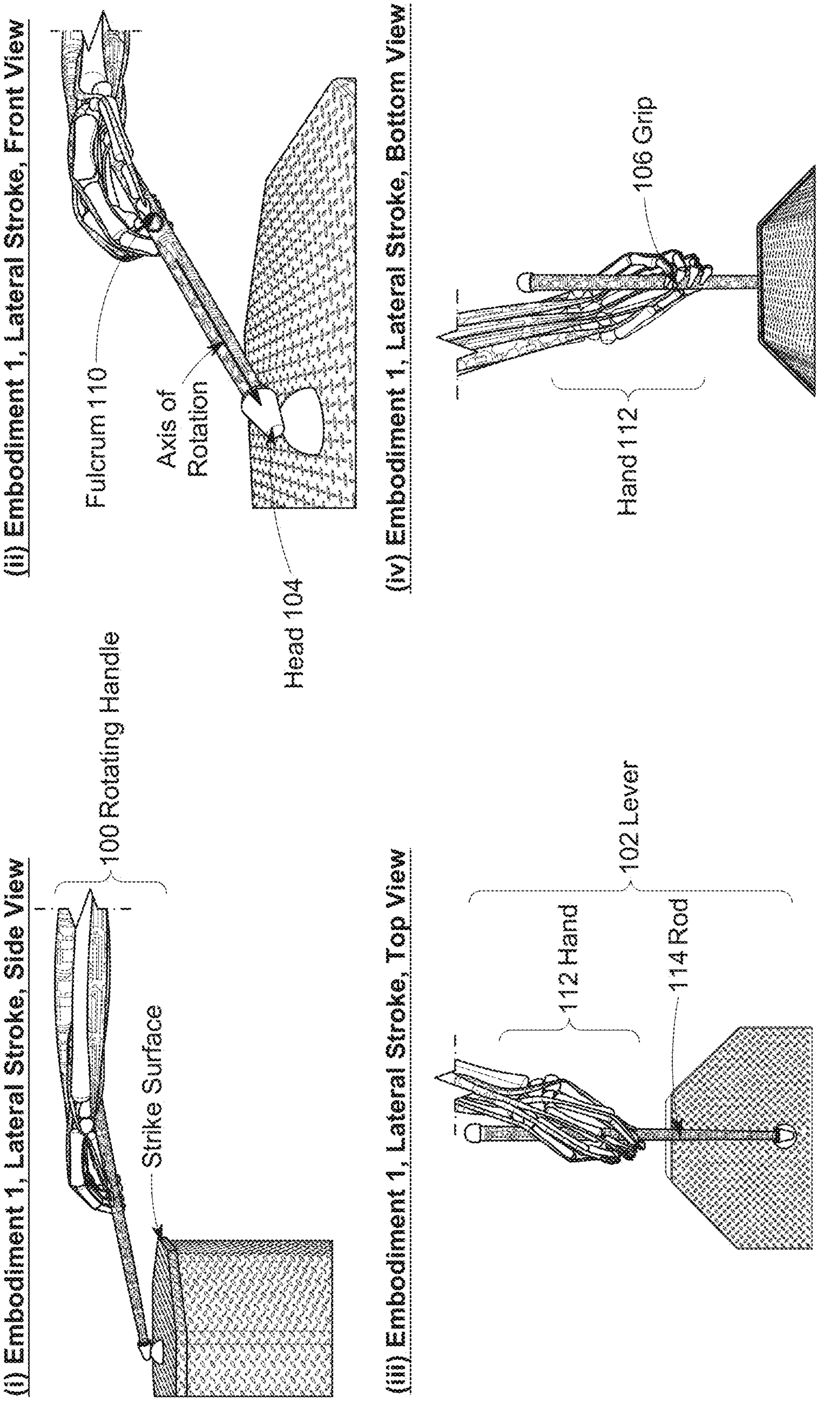
FIGS. 3(*a*)-3(*c*) illustrate one embodiment of the concept of the rotating handle.
Figure 3B:
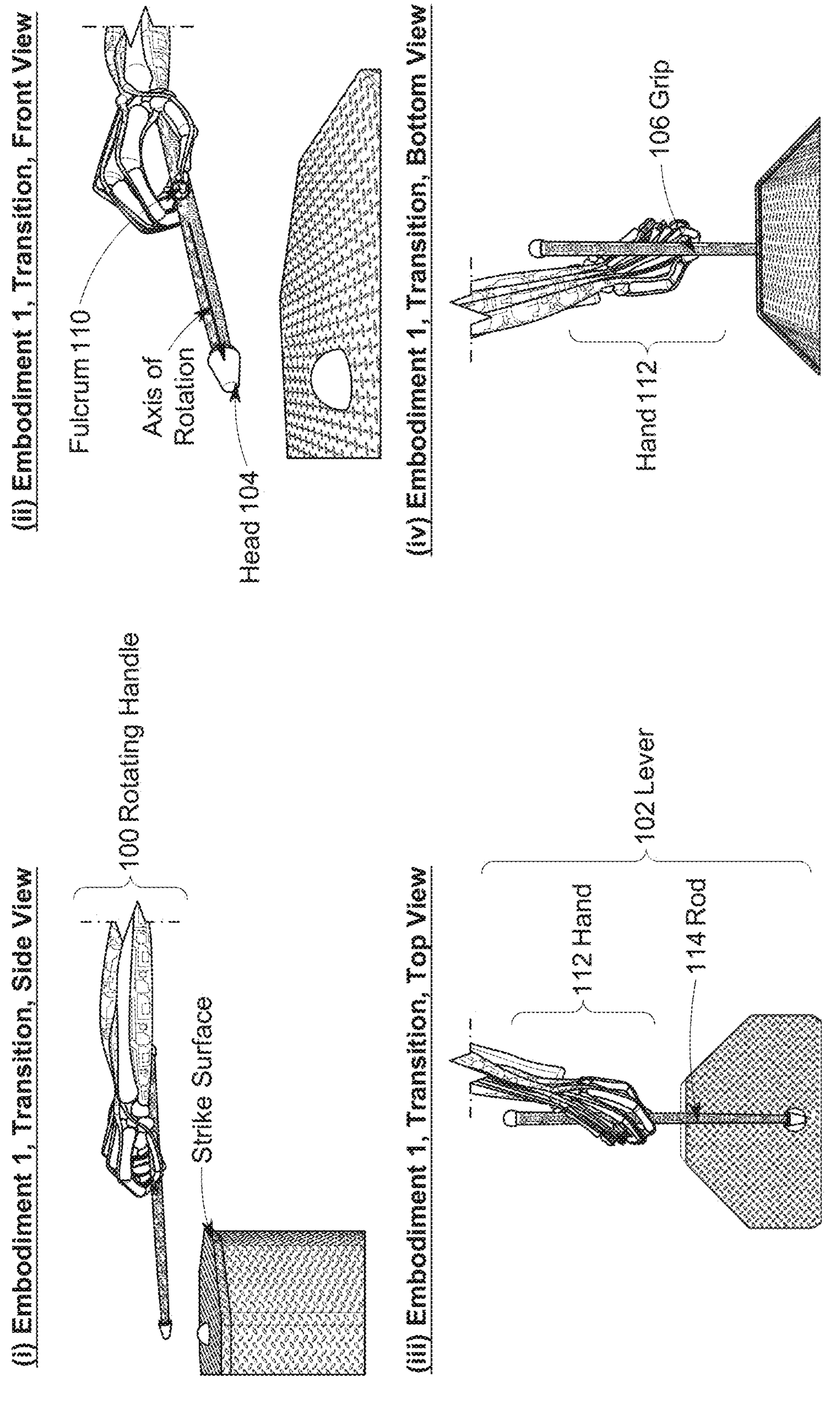
Figure 3C:
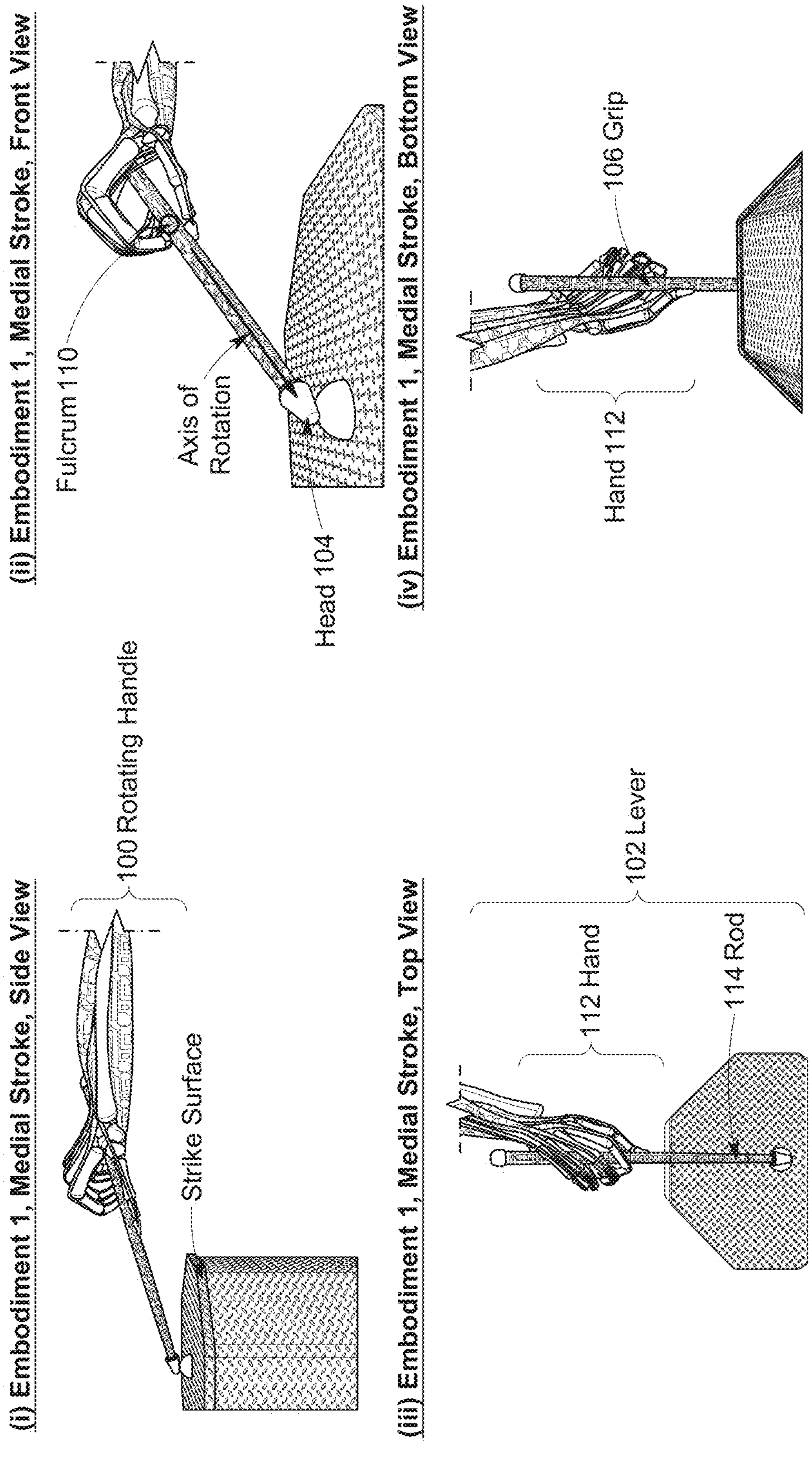
Figure 4A:
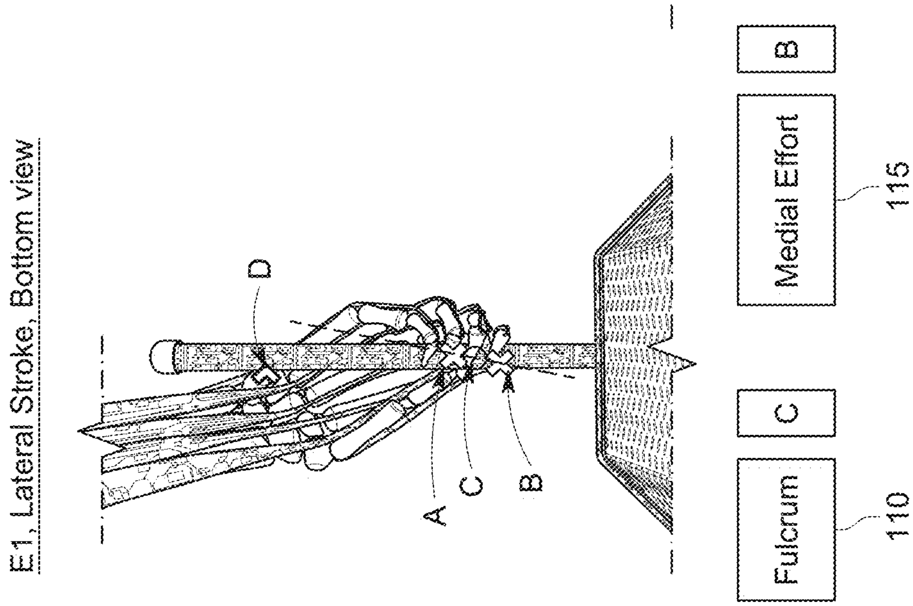
FIG. 4(*a*)-4(*c*) further illustrates one embodiment of the concept of the rotating handle.
Figure 4B:
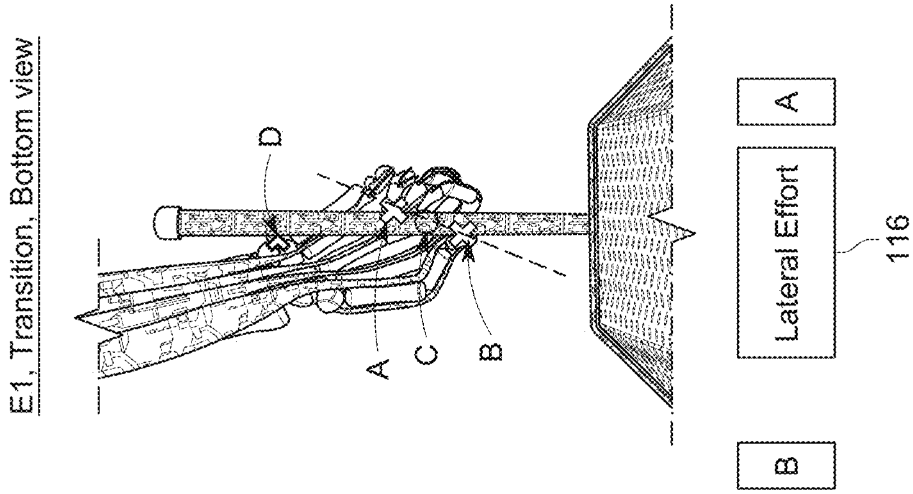
Figure 4C:
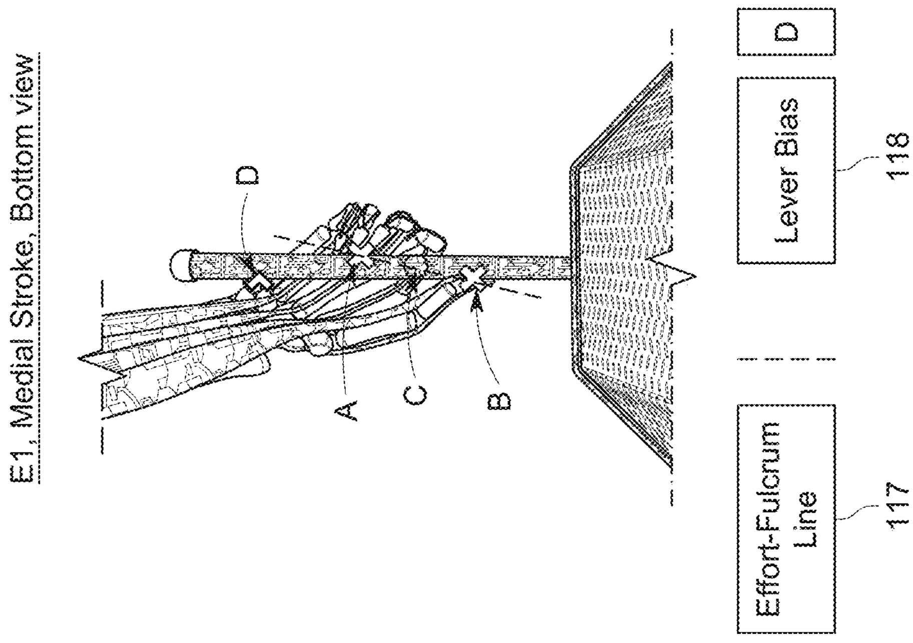

Rotating handle 100 of the present invention includes a lever 102 with a head component 104 and grip component 106 that is rotatable about an axis of rotation connected to the fulcrum 110 around which a "hand" component 112 rotates, as illustrated in FIG. 3 and FIG. 4. The rotating handle 100 may also include components for providing force or effort and for controlling operations of the invention.

Figure 6:
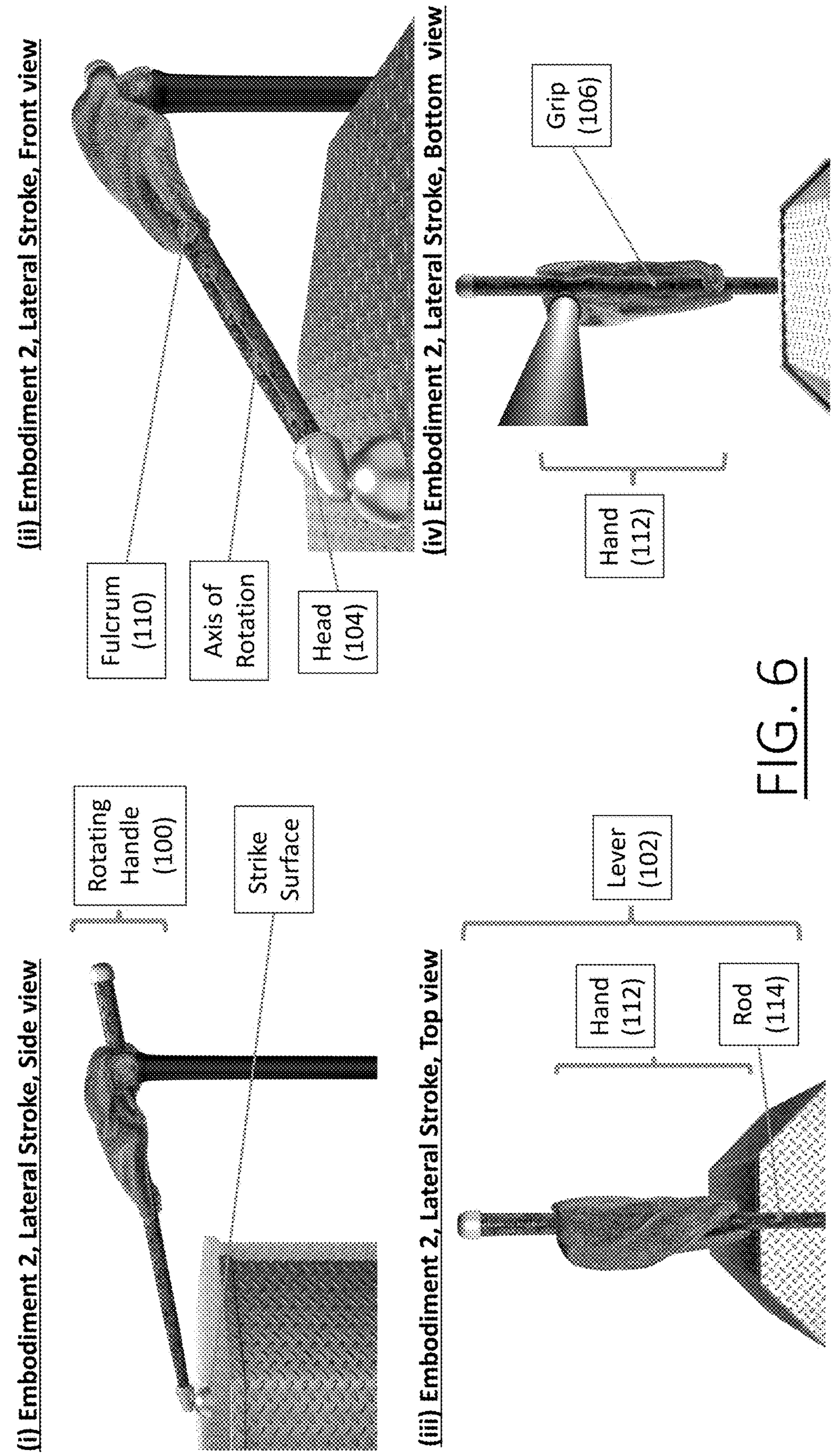
FIG. 6 illustrates a second embodiment of the concept of the rotating handle.

The lever portion 102 may be made of any suitable material, such as plastic, rubber, metal, or a combination thereof. Lever 102 may have a variety of shapes and sizes to accommodate different users and devices. Gripping portion 106 of lever 102 may have a log spiral "hand" 112 positioned around a tapered rod 114 connected to head component 104. In one embodiment (E1), the spiral "hand" 112 includes biomimetic components intended to replicate the bones, muscles, and connectors of the human hand. The spiral "hand"112 is clenched around the rod 114 such that the fulcrum 110 is at the rod's mass midpoint. Lever 102 is designed to be a three dimensional spiral structure with component parts equivalent to those of the human hand. In other embodiments, such as E2 in FIGS. 6 and 7, the basic functionality can be achieved without fewer biomimetic parallels. In all embodiments, the hand-like spirals 112 apply effort to the lever in a novel fashion that improves hammering efficiency significantly.

Figure 7:
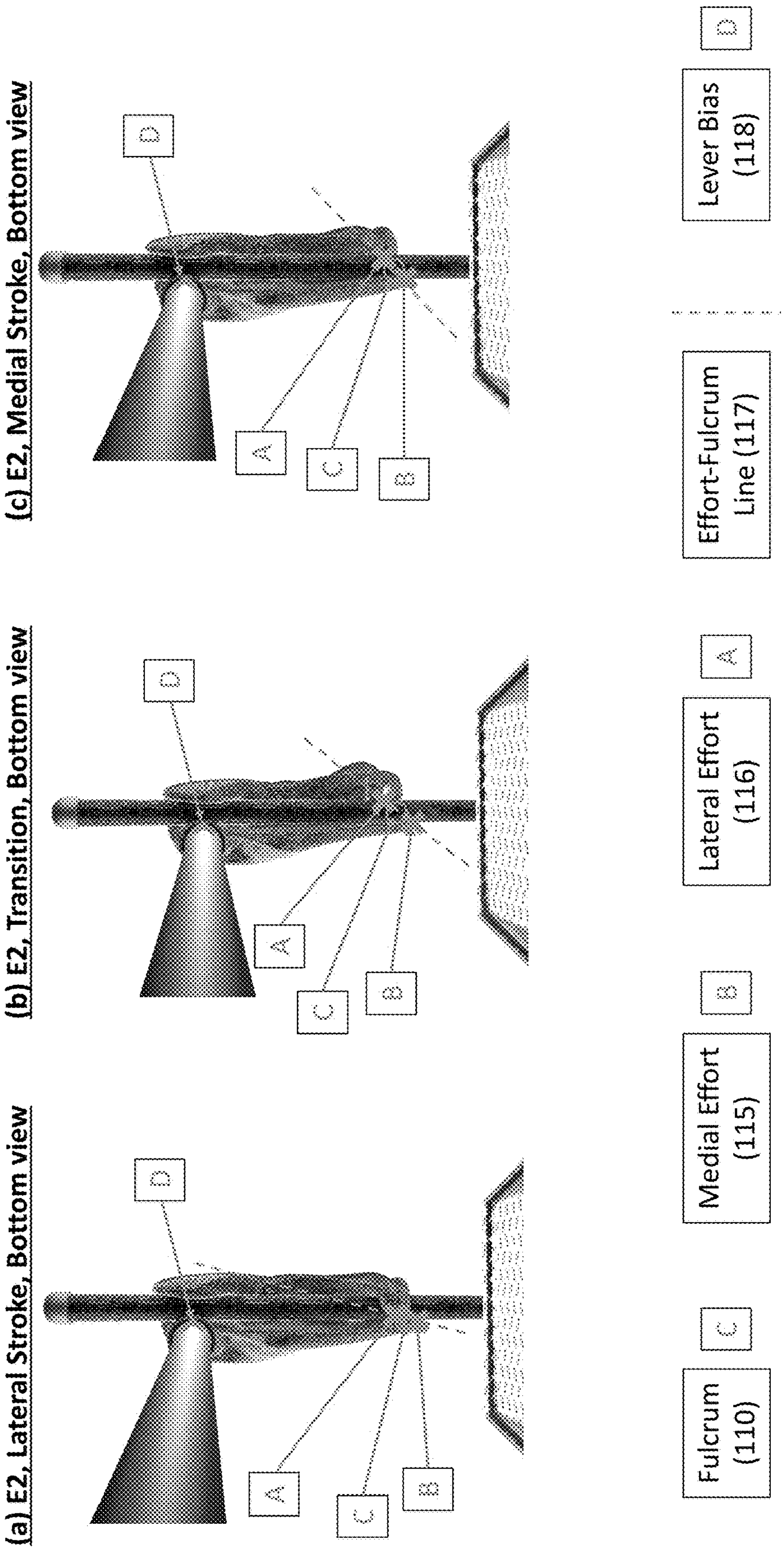
FIG. 7 further illustrates a second embodiment of the concept of the rotating handle.

In both embodiments (E1 and E2), the fulcrum at the rod's mass midpoint is free-floating, held in place by the spiral "hand" 112 via countervailing force applied at the medial effort point 115 and the lateral effort point 116 at one end of the 3D spiral segment with support from the lever bias point 118 at the opposite end of the 3D spiral segment, as illustrated in FIGS. 4 and 7. As the spiral "hand" 112 rotates from lateral stroke (a) through transition (b) to medial stroke (c) and back, the fulcrum remains static.

Figure 5:
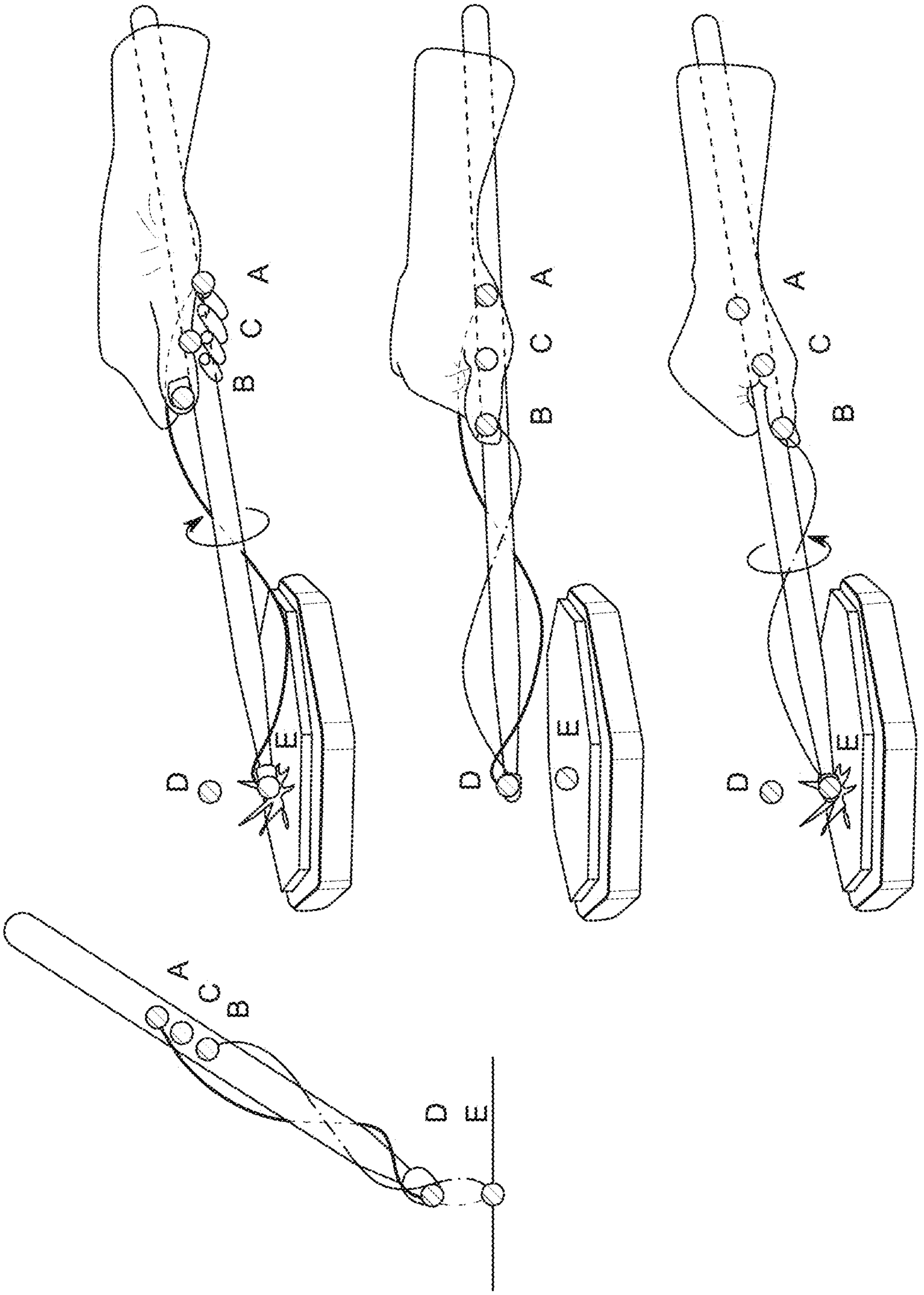
FIG. 5 illustrates the biomechanical basis for the rotating handle.

As illustrated in FIG. 5, during use, downward rotational force is applied at (A), positioned at the rod's intersection with the horizontal plane. The rod rotates in three dimensions around the fulcrum at (C), translating the effort applied at (A) to a downward hammer stroke at load (D) and rotating (A) below the horizontal plane and (B) above it via segmental interaction. Downward rotational force is then applied at (B), moving it through the horizontal plane and below while producing another downward stroke at (D) and rotating (A) back up above the horizontal plane.

The hand-like spirals, as illustrated in FIGS. 4 and 5 are the essential component of the invention. The novelty here inheres in the use of a single segment of a 3D log spiral to produce repeatable downward strokes of the lever, relying on segmental interaction to provide the upstroke without active effort against gravity. The articulation of the spiral structure per the structure of the human hand (e.g., mimicking the five-finger structure, etc.) will be used in one embodiment. However, different articulations of the structure may be possible using non-biomimetic materials that provide other benefits, as in embodiment 2 (E2), so ideally coverage will extend to any 3D log spiral operated as described here.

The two Effort arms (A and B) are equidistant from the Fulcrum and symmetric with respect to each other. A is the outer edge of the "thumb" at one extremity of the 3D log spiral device. B is the midpoint between the 3rd and 4th "fingers". When the device is inactive (or at the midpoint of the transition between medial and lateral strokes), A and B rest directly on either side of the rod, in its horizontal plane parallel to the strike surface. To produce a downward hammer stroke at D (the head component 104), which strikes the surface E (representing the Load of the lever), downward rotational force is applied at A by the "thumb". The segmental interaction of the components of the "hand" unit as A rotates down below the rod's horizontal plane and simultaneously rotates B up above that plane in preparation for the next downstroke.

Applying downward rotational force at B now raises the hammer end of the rod as B approaches the horizontal plane of the rod from above, and then produces another hammer stroke at E as B rotates below the horizontal plane, simultaneously raising A back above the horizontal plane. Alternating application of downward rotational force at A and B produces rhythmic repeated hammering, exclusively utilizing downward strokes. The movement of the "hand" to produce effort by applying alternating downward rotational force at each effort arm (A and B)—requires a power source, but all other movements in the system follow directly due to mechanical properties of the elements that comprise the system with no additional power required.

Rotating handle 100 may have a control system 120, sensor system 140, battery and charging system 150, and a drive mechanism 160, as illustrated in FIG. 1. Rotating handle 100 may include a control system 120 for operational control of the various other components. Rotating handle 100 may include one or more sensors 140 for relative positioning, optimal sequential segment operation, and active feedback. Rotating handle 100 may include a battery and charging system 150 for performance regenerative pressure plate power systems and solar charging. Rotating handle 100 may include a drive mechanism 160 that may be a motor, hydraulic system, or pneumatic system to drive the various components during use.

Battery and charging system 150 of rotating handle 100 provides the energy to power control system 120, sensors 140, and drive mechanism 160 during the process of use. Rotating handle 100 may be powered by methods known by those of ordinary skill in the art. In some embodiments, rotating handle 100 may plug into an electrical outlet using an electrical cord to supply power to control system 120, sensors 140, and drive mechanism 160. Further, battery and charging system 150 may include a rechargeable battery pack whereby the rechargeable battery is of a charge, design, and capacity to provide sufficient power to control system 120, sensors 140, and drive mechanism 160 during operation for a set period of time needed.

Battery and charging system 150 may have a solar energy collector for collecting and converting solar energy to electrical energy. The solar generated electrical energy then passes through a first controller for distributing the electrical energy. The electrical energy may be stored in a battery; however, it may be used immediately to create a potential energy difference. The battery may hold an electrical-chemical potential sufficient to power the various components of rotating handle 100 for a predetermined amount of time.

The battery may be connected to control system 120. Control system 120 may direct current flow to drive mechanism 160 or control system 120 after a preprogrammed or otherwise predetermined amount of time. The control system may include circuitry to provide an interface for the user to interact with, including switches, indicators, and accompanying circuitry for an electronic control panel or mechanical control panel.

Control system 120 may operate to control the actuation of the other systems. Control system 120 may have a series of computing devices which will be discussed in detail later in the description. Control system 120 may be in the form of a circuit board, a memory or other non-transient storage medium in which computer-readable coded instructions are stored, and one or more processors configured to execute the instructions stored in the memory. Control system 120 may have a wireless transmitter, a wireless receiver, and a related computer process executing on the processors.

Computing devices of control system 120, may be any type of computing device that typically operates under the control of one or more operating systems which control scheduling of tasks and access to system resources. Computing devices may be a Raspberry Pi® or other computing devices such as but not limited to a phone, tablet, television, desktop computer, laptop computer, networked router, networked switch, networked bridge, or any computing device capable of executing instructions with sufficient processor power and memory capacity to perform operations of control system 120.

The one or more computing devices may be integrated into control system 120, while in other non-limiting embodiments, control system 120 may be a remotely located computing device or server configured to communicate with one or more other control systems 120. Control system 120 may also include an internet connection, network connection, and/or other wired or wireless means of communication (e.g., LAN, etc.) to interact with other components. The connection allows a user to update, control, send/retrieve information, monitor, or otherwise interact passively or actively with control system 120

Control system 120 may include control circuitry and one or more microprocessors or controllers acting as a servo control mechanism capable of receiving input from sensors 140 and drive mechanism 160, analyzing the input from sensors 140 and drive mechanism 160, and generating an output signal to drive mechanism 160 and battery and charging system 150. The microprocessors (not shown) may have on-board memory to control the power that is applied to drive mechanism 160, sensors 140, and battery and charging system 150 in response to input signals from the user and from sensors 140

Control system 120 may include circuitry to provide an interface for a user to interact with, including switches and indicators, and accompanying circuitry for an electronic control panel or mechanical control panel. Such an interface may present options to the user to select from such as, without limitation, different tread modes and speeds. Control system 120 may be preprogrammed with any reference values, by any combination of hardwiring, software, or firmware to implement various operational modes including but not limited to elevation and terrain values.

The microprocessors in control system 120 may also monitor the current state of circuitry within control system 120 to determine the specific mode of operation chosen by the user. For instance, when "on," the microprocessors may begin to autonomously traverse terrain. Further, such microprocessors that may be part of control system 120 may receive signals from drive mechanism 160, sensors 140, and battery and charging system 150 such as whether any of the components in the various systems need to be replaced.

Drive mechanism 160 may have motors that have a drive member. The motor may be connected to the lever, and when the motor is activated, it applies force to the lever. The lever amplifies the force applied by the motor, allowing for the movement of heavy objects or materials with less physical effort. The motor can be an electric motor or any other type of motor capable of providing a rotational force. The motor is coupled to the lever through a transmission system. The transmission system can include a gear system or a belt and pulley system, among other things. When the motor is activated, it provides a rotational force that is transmitted through the transmission system to the lever.

Sensors 140 may include a plurality of detectors mounted to the housing of rotating handle 100 in the form of standard infrared ("IR") detectors having photodiodes and related amplification and detection circuitry. In other embodiments, radio frequencies, magnetic fields, infrared, computer vision, potentiometers, ultrasonic sensors, and transducers may be employed. Detectors may be arranged in any number of configurations and arrangements. For example, in one embodiment, rotating handle 100 may include an omnidirectional detector mounted to the top and bottom of rotating handle 100 to detect signals from a 360 degrees field of view, while in other embodiments, various detectors may be mounted on the side of rotating handle 100 which may be used to form a collective field of view of detection. In some embodiments, rotating handle 100 may use any number of Lidar systems with improved scanning speed for high-resolution depth mapping.

Figure 2:
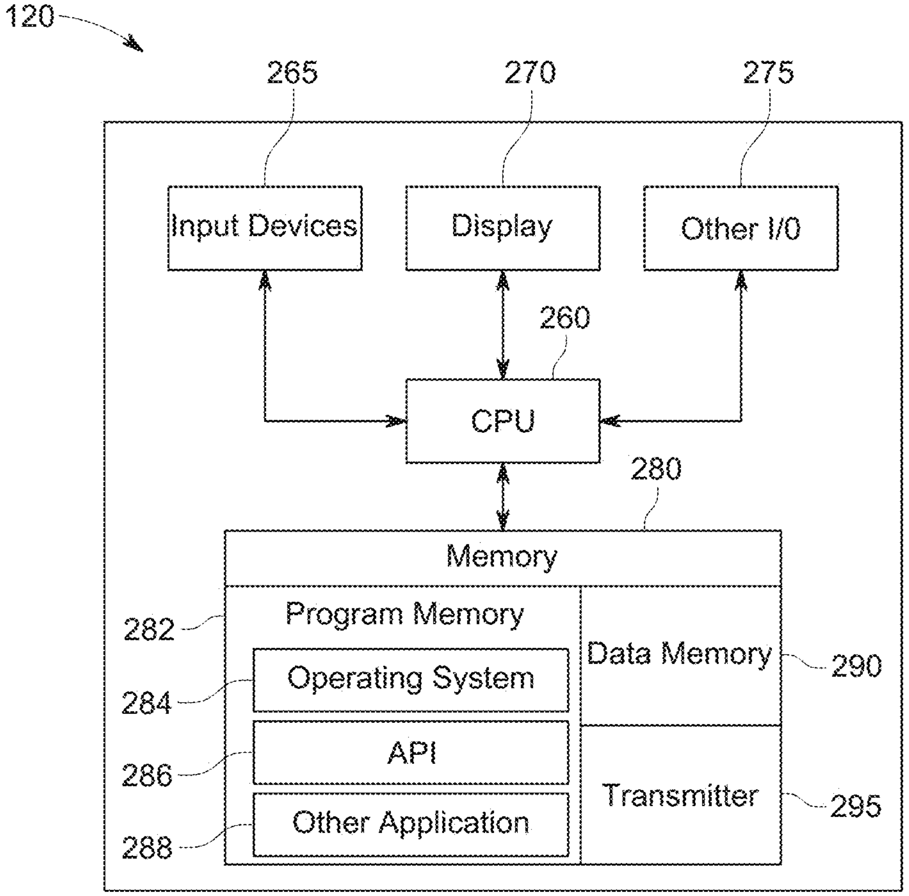
FIG. 2 illustrates the components of the computing device.

Turning to FIG. 2, FIG. 2 is a block diagram showing various components of computing devices of control system 120. Computing devices may comprise a housing for containing one or more hardware components that allow access to edit and query a communication system. Computing devices may include one or more input devices such as input devices 265 that provide input to a CPU (processor) such as CPU 260 of actions related to the user. Input devices 265 may be implemented as a keyboard, a touchscreen, a mouse, via voice activation, wearable input device, a camera, a trackball, a microphone, a fingerprint reader, an infrared port, a controller, a remote control, a fax machine, and combinations thereof.

The actions may be initiated by a hardware controller that interprets the signals received from input device 265 and communicates the information to CPU 260 using a communication protocol. CPU 260 may be a single processing unit or multiple processing units in a device or distributed across multiple devices. CPU 260 may be coupled to other hardware devices, such as one or more memory devices with the use of a bus, such as a PCI bus or SCSI bus. CPU 260 may communicate with a hardware controller for devices, such as for a display 270. Display 270 may be used to display text and graphics. In some examples, display 270 provides graphical and textual visual feedback to a user.

In one or more embodiments, display 270 may include an input device 265 as part of display 270, such as when input device 265 is a touchscreen or is equipped with an eye direction monitoring system. In some implementations, display 270 is separate from input device 265. Examples of display 270 include but are not limited to: an LCD display screen, an LED display screen, a projected, holographic, virtual reality display, or augmented reality display (such as a heads-up display device or a head-mounted device). Display 270 may also comprise a touch screen interface operable to detect and receive touch input such as a tap or a swiping gesture. Other I/O devices such as I/O devices 275 may also be coupled to the processor, such as a network card, video card, audio card, USB, FireWire or other external device, camera, printer, speakers, CD-ROM drive, DVD drive, disk drive, or Blu-Ray device. In further non-limiting embodiments, a display may be used as an output device, such as, but not limited to, a computer monitor, a speaker, a television, a smart phone, a fax machine, a printer, or combinations thereof.

CPU 260 may have access to a memory such as memory 280. Memory 280 may include one or more of various hardware devices for volatile and non-volatile storage and may include both read-only and writable memory. For example, memory 280 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. Memory 280 may be a non-transitory memory.

Memory 280 may include program memory such as program memory 282 capable of storing programs and software, including an operating system, such as operating system 284. Memory 280 may further include an application programming interface (API), such as API 286, and other computerized programs or application programs such as application programs 288. Memory 280 may also include data memory such as data memory 290 that may include database query results, configuration data, settings, user options, user preferences, or other types of data, which may be provided to program memory 282 or any element of computing devices.

Computing devices may have a transmitter 295, such as transmitter 295, to transmit the data. Transmitter 295 may have a wired or wireless connection and may comprise a multi-band cellular transmitter to connect to the server over 2G/3G/4G/5G. cellular networks, etc. Other embodiments may also utilize Near Field Communication (NFC), Bluetooth, or another method to communicate information.

Rotating handle 100 may be used in various devices, such as hand tools, power tools, machinery, and appliances. For example, the rotating handle 100 may be used in a wrench, a screwdriver, a drill, a saw, a mixer, a blender, or any other device that requires a handle. The rotating handle 100 provides improved ergonomics and increased torque for the user, resulting in improved performance and reduced fatigue.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A lever comprising a head component and a gripping portion that is connected to a rotating portion that is rotatable about an axis of rotation connected to a fulcrum of which the lever rotates, wherein the lever is designed to be a three dimensional spiral structure with component parts equivalent to those of a human hand.

2. The lever of claim 1, wherein the lever is made of metal, plastic, or rubber.

3. The lever of claim 1, wherein the gripping portion has a log spiral hand component.

4. The lever of claim 3, wherein the log spiral hand component is positioned around a tapered rod connected to the head component.

5. The lever of claim 4, wherein the log spiral hand component includes biomimetic components intended to replicate bones, muscles, and connectors of the human hand.

6. The lever of claim 5, wherein the log spiral hand component has a five finger structure.

7. The lever of claim 6, wherein the log spiral hand component is clenched around the tapered rod such that the fulcrum is at a mass midpoint of the tapered rod.

8. A lever comprising a three dimensional log spiral structure that applies alternating downward rotational force at two points along a rod of the lever, producing rhythmic applications of leverage around a fulcrum.

9. The lever of claim 8, wherein the three dimensional log spiral structure includes biomimetic components intended to replicate bones, muscles, and connectors of a human hand.

10. The lever of claim 9, wherein the three dimensional log spiral structure has a five finger structure.

11. The lever of claim 10, wherein the three dimensional log spiral structure is clenched around the rod such that the fulcrum is at a mass midpoint of the rod.

12. A method for usage of a lever, the lever comprising a three dimensional log spiral structure that applies alternating downward rotational force at two points along a rod of the lever, producing rhythmic applications of leverage around a fulcrum, the method comprising:

applying downward rotational force at a first point of the rod, the first point positioned at an intersection of the rod with a horizontal plane.

13. The method of claim 12, further comprising: rotating the rod in three dimensions around the fulcrum;

translating effort applied at the first point to a downward hammer stroke at load; and rotating the first point below the horizontal plane and a second point above the horizontal plane via segmental action.

14. The method of claim 13, further comprising: applying downward rotational force at the second point, moving the second point through the horizontal plane and below while producing another downward stroke at the load and rotating the first point back above the horizontal plane.

* * * * *